United States Patent
Villasenor

(10) Patent No.: US 9,788,255 B2
(45) Date of Patent: Oct. 10, 2017

(54) ROAMING FOR WI-FI/WI-FI DIRECT DEVICES

(71) Applicant: Plantronics, Inc., Santa Cruz, CA (US)

(72) Inventor: Luis Villasenor, Tijuana (MX)

(73) Assignee: Plantronics, Inc., Santa Cruz, CA (US)

(*) Notice: Subject to any disclaimer, the term of this patent is extended or adjusted under 35 U.S.C. 154(b) by 236 days.

(21) Appl. No.: 14/469,454

(22) Filed: Aug. 26, 2014

(65) Prior Publication Data

US 2016/0066247 A1    Mar. 3, 2016

(51) Int. Cl.
H04W 4/00 (2009.01)
H04W 40/14 (2009.01)
H04W 36/00 (2009.01)
H04W 84/12 (2009.01)

(52) U.S. Cl.
CPC ........... H04W 40/14 (2013.01); H04W 36/00 (2013.01); *H04W 84/12* (2013.01)

(58) Field of Classification Search
CPC .............................. H04W 80/04; H04W 36/18
USPC ......................................................... 370/331
See application file for complete search history.

(56) References Cited

U.S. PATENT DOCUMENTS

| | | | |
|---|---|---|---|
| 2010/0124203 A1* | 5/2010 | Tenny | H04W 36/24 370/331 |
| 2013/0198412 A1* | 8/2013 | Saito | H04L 29/12009 709/245 |
| 2014/0105195 A1* | 4/2014 | Balasubarmaniyan | H04W 48/20 370/338 |
| 2014/0169212 A1 | 6/2014 | Villasenor | |
| 2015/0098598 A1* | 4/2015 | Kulavik | H04S 1/005 381/309 |
| 2015/0195686 A1* | 7/2015 | Yu | H04W 4/08 370/338 |
| 2015/0223134 A1* | 8/2015 | Hou | H04W 36/0011 370/331 |
| 2015/0230283 A1* | 8/2015 | Li | H04B 5/0031 455/41.1 |
| 2015/0296416 A1* | 10/2015 | Lee | H04W 8/005 370/331 |

* cited by examiner

*Primary Examiner* — Andrew Chriss
*Assistant Examiner* — Kenan Cehic
(74) *Attorney, Agent, or Firm* — Chuang Intellectual Property Law

(57) ABSTRACT

Methods and apparatuses for Wi-Fi network and Wi-Fi Direct operation are disclosed. In one example, audio data is exchanged between a wireless Wi-Fi/WFD device and a Wi-Fi/WFD base over a private network using a Wi-Fi Direct communications link. A Wi-Fi communications link between the wireless Wi-Fi/WFD device and a Wi-Fi Access Point is formed over a non-private network. Audio data is exchanged between the wireless Wi-Fi/WFD device and the Wi-Fi/WFD base over a non-private network using the Wi-Fi communications link.

22 Claims, 10 Drawing Sheets

ROAMING FOR WI-FI/WI-FI DIRECT DEVICES

BACKGROUND OF THE INVENTION

Wi-Fi networks are widely used for communications in wireless local area networks. However, when used for audio applications, such Wi-Fi networks often have Quality of Service issues, including audio latency, handoff latency, packet loss, and traffic load issues. As a result, improved methods and apparatuses for Wi-Fi network architectures are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
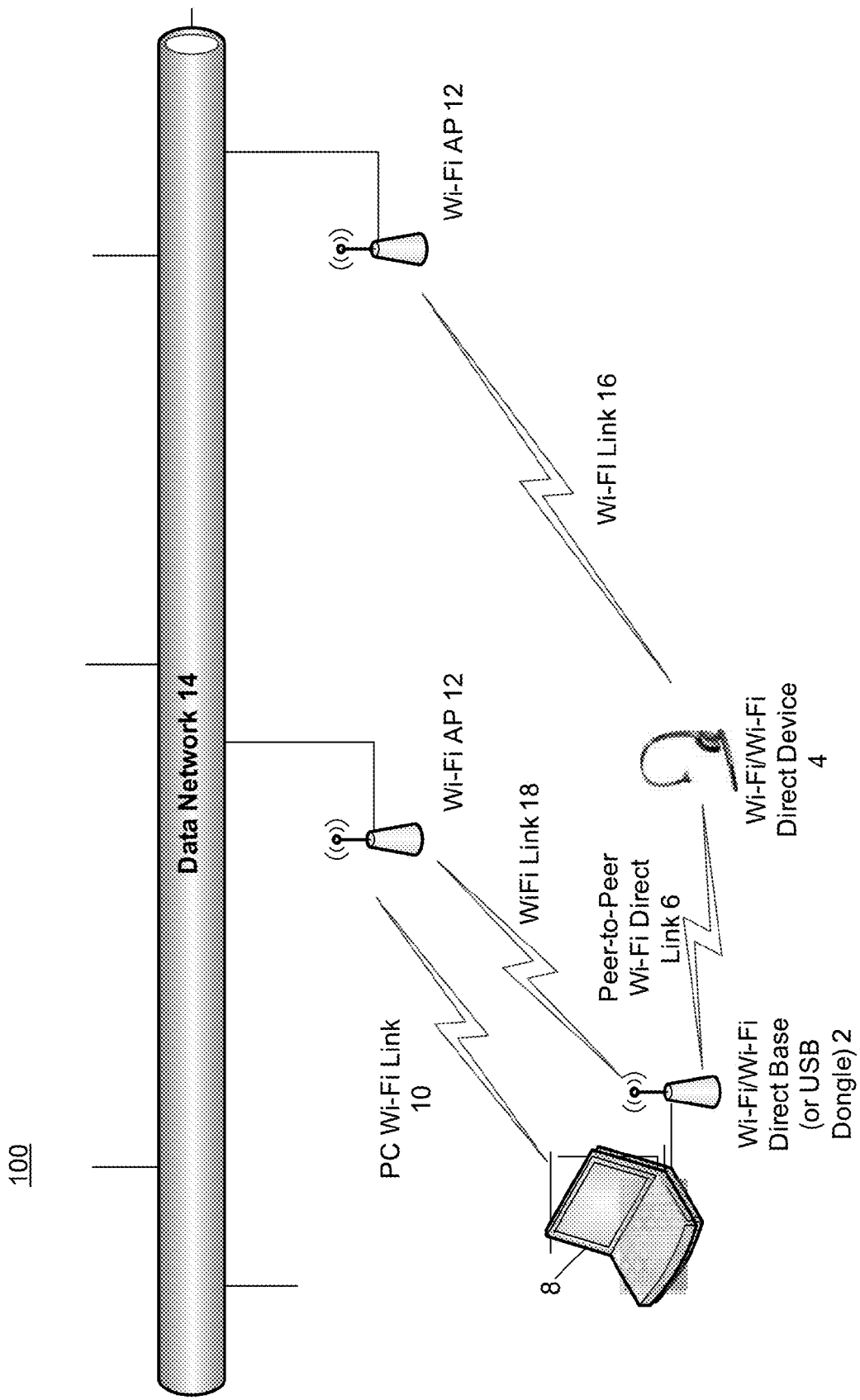
FIG. 1 illustrates a system for a Wi-Fi network in one example.

Methods and apparatuses for Wi-Fi networks and Wi-Fi Direct (abbreviated herein as "WFD") operation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example embodiment, a method includes transporting bidirectional audio data between a wireless Wi-Fi/WFD device and a Wi-Fi/WFD base over a private network using the Wi-Fi Direct communications link between the wireless Wi-Fi/WFD device and the Wi-Fi/WFD base. The method includes detecting a reduced signal quality of the Wi-Fi Direct communications link. The method further includes establishing a connection with a non-private network by forming a Wi-Fi communications link between the wireless Wi-Fi/WFD device and a Wi-Fi Access Point, the wireless Wi-Fi/WFD device operating in a Wi-Fi Direct concurrent mode, wherein the Wi-Fi communications link is concurrent with the Wi-Fi Direct communications link. The method further includes transporting bidirectional audio data at the wireless Wi-Fi/WFD device over a non-private network using the Wi-Fi communications link.

In one example, the method of this embodiment further includes receiving a handoff message at the Wi-Fi/WFD base from the wireless Wi-Fi/WFD device over a private network using the Wi-Fi Direct communications link between the wireless Wi-Fi/WFD device and the Wi-Fi/WFD base, the handoff message comprising of both the wireless Wi-Fi/WFD device private and non-private Internet Protocol addresses. The method further includes establishing a connection with a non-private network by forming a Wi-Fi communications link between the Wi-Fi/WFD base and a Wi-Fi Access Point, the Wi-Fi/WFD base operating in a Wi-Fi Direct concurrent mode, wherein the Wi-Fi communications link between the Wi-Fi/WFD base is concurrent with the Wi-Fi Direct communications link between the wireless Wi-Fi/WFD device and the Wi-Fi/WFD base. The method includes rerouting the audio data from the Wi-Fi/WFD base over the Wi-Fi Direct communications link between the wireless Wi-Fi/WFD device and the Wi-Fi/WFD base to the Wi-Fi communications link between the Wi-Fi/WFD base and the Wi-Fi Access Point. The method further includes terminating the private network connection over the Wi-Fi Direct communications link between the wireless Wi-Fi/WFD device and the Wi-Fi/WFD base.

In one example, the method of this embodiment further includes detecting an increased signal quality between the wireless Wi-Fi/WFD device and the Wi-Fi/WFD base, and forming a reestablished private network using a Wi-Fi Direct communications link between the wireless Wi-Fi/WFD device and the Wi-Fi/WFD base. The method further includes routing the audio data between the wireless Wi-Fi/WFD device and the Wi-Fi/WFD base over the reestablished Wi-Fi Direct communications link.

In one example embodiment, a method includes transmitting and receiving audio data directly between a wireless Wi-Fi/WFD device and a Wi-Fi/WFD base over a private network using a Wi-Fi Direct communications link between the wireless Wi-Fi/WFD device and the Wi-Fi/WFD base. The method includes monitoring a signal quality of the Wi-Fi Direct communications link, and identifying whether the signal quality of the Wi-Fi Direct communications link is below a desired level. The method further includes transmitting and receiving audio data between the wireless Wi-Fi/WFD device and the Wi-Fi/WFD base utilizing one or more Wi-Fi Access Points over a non-private network.

In one example embodiment, a system includes a Wi-Fi/WFD base operable in Wi-Fi Direct mode or Wi-Fi mode and a wireless Wi-Fi/WFD device operable in Wi-Fi Direct mode or Wi-Fi mode. The Wi-Fi/WFD base includes a base processor. The Wi-Fi/WFD base further includes a memory storing a base application program comprising instructions which when executed by the base processor cause the Wi-Fi/WFD base to perform operations comprising transmitting and receiving audio data to a wireless Wi-Fi/WFD device in either Wi-Fi Direct mode or Wi-Fi mode.

The wireless Wi-Fi/WFD device includes a wireless Wi-Fi/WFD device processor. The wireless Wi-Fi/WFD device further includes a memory storing a wireless Wi-Fi/WFD device application program comprising instructions which when executed by the wireless Wi-Fi/WFD device processor cause the wireless Wi-Fi/WFD device to perform operations comprising, responsive to a signal strength between the wireless Wi-Fi/WFD device and the Wi-Fi/WFD base, either communicate with a Wi-Fi/WFD base over a Wi-Fi Direct communications link between the wireless Wi-Fi/WFD device and the Wi-Fi/WFD base using a private network, or communicate with a Wi-Fi/WFD base utilizing one or more Wi-Fi Access Points using a non-private network.

Various examples described herein are related to the network architecture and networking devices, as well as applications, deployed to provide enhanced functionalities for audio/voice applications using Wi-Fi/WFD devices such as Wi-Fi/WFD headsets. In one example, a network architecture for audio/voice communications using Wi-Fi/WFD is implemented. The architecture makes use of (1) Wi-Fi/WFD bases with enhanced firmware functionalities, and (2) Wi-Fi/WFD devices such as headsets with enhanced firmware functionalities, and (3) Wi-Fi Access Points. For example, the architecture may be deployed in an enterprise environment. The term Wi-Fi as used herein refers generally to any wireless local area network (WLAN) products that are based on the Institute of Electrical and Electronics Engineers (IEEE) 802.11 standards, including the 802.11a, 802.11b, 802.11g, and/or 802.11n wireless networking standards. The term Wi-Fi as used herein excludes the functionalities defined for Wi-Fi Direct. Whereas the term Wi-Fi Direct makes reference to the extended functionalities of Wi-Fi devices to support communications between two devices using a peer-to-peer communication link.

Wi-Fi Direct is also utilized in the methods and apparatuses described herein. Wi-Fi Direct is a standard that allows Wi-Fi Direct devices to connect to each other with greatly reduced setup. Wi-Fi Direct embeds a software access point (Soft AP) into any device supporting Wi-Fi Direct. The "Wi-Fi Peer-to-Peer (P2P) Technical Specification", Version 1.1, as published by the Wi-Fi Alliance, defines a procedure to greatly simplify the connectivity between devices using a peer-to-peer link approach, and is hereby incorporated by reference. As a result Wi-Fi Direct devices can now discover other WFD devices and launch a connection procedure, similar to the Bluetooth pairing process. A Wi-Fi/WFD chipset providing a high level of integration may be used, providing a standalone solution that does not require an external microcontroller (MCU). The chipset also provides audio capabilities, so a speaker and a microphone can be directly connected to the device.

The use of devices based on Wi-Fi/WFD technology opens the possibility of interoperability with already deployed Wi-Fi networks and Wi-Fi devices in consumer and enterprise environments. For example, a Wi-Fi headset is capable of receiving an audio stream (via a wireless access point) from an Internet-based audio content server without the need of any other intermediate devices, such as a PC, tablet or smartphone. Other possibilities may include roaming support in the Wi-Fi headset by relaying audio/voice streams over the WLAN infrastructure, thus extending the service coverage within a building.

One advantage of using a Wi-Fi/WFD device for VoIP communications in an Enterprise environment is the possibility to extend the communication coverage by using the Enterprise Wi-Fi infrastructure. In this way a Wi-Fi/WFD device can roam inside a building and still have connectivity to the network via the use of any Wi-Fi Enterprise Access Point (AP). On the other hand, one of the major challenges is related to the provisioning of adequate Quality of Service (QoS) to offer a good experience to the user. This is particularly critical during roaming, where the Wi-Fi/WFD device changes connectivity from one access point to another access point. During roaming, the Wi-Fi headset will experience horizontal handoffs as the Wi-Fi headset disconnects from a previous AP and reconnects to a new AP. As a result, the Wi-Fi headset experience handoff latency and packet loss. Consequently, it is important to implement adequate mechanisms to help improve roaming and at the same time help improve the QoS experienced by the user.

In one example, methods and apparatuses are presented for an improved roaming mechanism for a Wi-Fi/WFD based wireless headset in an Enterprise environment. This mechanism takes advantage of the Wi-Fi Enterprise infrastructure, as well as, the WFD concurrent operation mode running on a Wi-Fi/WFD base and a Wi-Fi/WFD headset. System components include a USB Wi-Fi/WFD base and a Wi-Fi/WFD headset. A roaming algorithm is utilized to manage the roaming process. In one example embodiment, the algorithm makes use of contextual information provided by embedded sensors, such as an accelerometer, as well as, the Received Signal Strength Indication (RSSI) provided by the Wi-Fi adapter.

Improved roaming functionalities for VoIP communications in Enterprise environments are provided. The implementation of such approach will help reduce latency and packet loss during horizontal handoffs (i.e., when a wireless device changes connectivity from a wireless base (or access point) to another wireless base (or AP) and makes use of the same wireless physical layer technology), significantly improving the quality of service experienced by the user while the user roams inside a building during an active call.

Advantages of the methods and apparatuses described herein include:

(1) Improved horizontal handoffs while the Wi-Fi/WFD headset roams inside a building by reducing handoff latency and packet loss. Especially when the Wi-Fi/WFD headset moves away from the coverage of the Wi-Fi/WFD base. The roaming mechanism makes use of a "make before break" strategy when the wireless headset moves away from the Wi-Fi/WFD base, as well as, when the wireless headset comes back into signal coverage with the base. As a result, handoff latency is negligible as audio data packets are not lost while using this roaming strategy.

(2) While the Wi-Fi/WFD headset is within coverage of the Wi-Fi/WFD base, it is possible to reduce traffic load in the Wi-Fi Enterprise network, as the VoIP communication between the base and the headset is made using the Peer-to-Peer (WFD) wireless link. The network architecture does not require the audio data communication path to make use of the Enterprise APs, while the headset is within signal coverage of the Wi-Fi/WFD base. As a result the audio data streaming between the base and the headset do not require any Enterprise AP to handle this traffic, thus reducing the impact of traffic load in the Enterprise APs.

(3) Reduced audio latency when using the Peer-to-Peer wireless link for VoIP communication between the Wi-Fi/WFD base and the Wi-Fi headset. When using the Peer-to-Peer wireless link, the communication path between the Wi-Fi/WFD base and the Wi-Fi/WFD headset is composed of a single wireless hop; as a result audio latency is minimized. Other networking architectures consider the use of the PC's Wi-Fi Adapter to achieve communication with the Wi-Fi headset. In this case the communication between the PC and the headset suffer higher latencies as a result of a two-hop wireless link when communicating over the wireless AP.

(4) No custom drivers are required in the PC to handle audio data streams between the PC and the Wi-Fi/WFD headset. The solution makes use of a USB base, so it is possible to configure the base to appear as a standard USB audio device. The PC's Operative System (OS) already implement by default driver support for standard USB audio device classes, so there is no need to develop and deploy additional drivers in the PC to support VoIP communication between the PC and the Wi-Fi/WFD headset. This approach greatly reduces compatibility issues related to new driver development required to be installed in the PC.

FIG. 1 illustrates a system 100 for a Wi-Fi network architecture in one example. System 100 includes a Wi-Fi/WFD base 2, wireless Wi-Fi/WFD device 4, and a plurality of Wi-Fi Access Points (APs) 12 (hereinafter referred to as Wi-Fi APs 12). The term "Wi-Fi/WFD" refers to a device capable of both Wi-Fi operation and Wi-Fi Direct operation, either individually or concurrently. Wi-Fi Access Points 12 are enterprise Access Points deployed in an enterprise data network 14 in one example. Each Wi-Fi/WFD base 2 is associated with a computing device 8 in a one-to-one relationship. In one example, a Wi-Fi/WFD base 2 is a USB device coupled to a USB port of the computing device 8. In a further example, the Wi-Fi/WFD base 2 and computing device 8 may be integrated into a single computing device, such as a desktop or laptop computer. In one example, the wireless Wi-Fi/WFD device 4 is a telecommunications headset as illustrated in FIG. 1. In one example, both Wi-Fi/WFD base 2 and Wi-Fi/WFD device 4 support the Wi-Fi Direct specification from the Wi-Fi Alliance, and thus may utilize a peer-to-peer Wi-Fi direct wireless link 6 thus forming a private network (i.e. it is not part of the enterprise data network).

Wi-Fi/WFD base 2 is operable in Wi-Fi Direct mode or Wi-Fi mode and wireless Wi-Fi/WFD device 4 is operable in Wi-Fi Direct mode or Wi-Fi mode. Wi-Fi/WFD base 2 may form and utilize Wi-Fi link 18 with a Wi-Fi AP 12 thus forming part of a non-private network (i.e. it is connected to the enterprise data network). Wi-Fi/WFD device 4 may form and utilize Wi-Fi link 16 with a Wi-Fi AP 12 thus forming part of a non-private network (i.e. it is connected to the enterprise data network). Computing device 8 may form a Wi-Fi link 10 with a Wi-Fi AP 12 thus forming part of a non-private network (i.e. it is connected to the enterprise data network). In further examples, there may be any number of Wi-Fi/WFD bases 2, Wi-Fi/WFD devices 4, Wi-Fi Access Points 12, and computing devices 8.

Wi-Fi AP(s) 12 are coupled to a data network 14. In one example, the data network 14 may be a communications network which may include a public switched telephone network (PSTN), an integrated services digital network (ISDN), a local area network (LAN), and/or a wireless local area network (WLAN), that support standards such as Ethernet, wireless fidelity (Wi-Fi), and/or voice over internet protocol (VoIP). In one example, the Wi-Fi AP 12 includes a transceiver and a processor configured to allow a wireless device (e.g., a headset) access to a data network 14 connected to the Wi-Fi AP 12 (e.g., via an Ethernet RJ-45 port). The Wi-Fi AP 12 may be any device that allows wireless-equipped computers and other devices to communicate with a wired network. The Wi-Fi AP 12 is able to support Wi-Fi. In other examples, the Wi-Fi AP 12 may also be able to support additional wireless networking standards.

In operation, the Wi-Fi/WFD device 4 and Wi-Fi/WFD base 2 implement firmware functionalities to support a bi-directional audio/voice stream between the Wi-Fi/WFD device 4 and the Wi-Fi/WFD base 2. The Wi-Fi/WFD device 4 and the Wi-Fi/WFD base 2 implement firmware functionalities to support a bi-directional audio/voice stream between Wi-Fi/WFD device 4 and a Wi-Fi AP 12, and between Wi-Fi/WFD base 2 and a Wi-Fi AP 12.

In one example, the Wi-Fi/WFD base 2 is a USB audio device at computing device 8. In one example implementation, Internet Protocol (IP) packets are sent between the Wi-Fi/WFD base 2 and the Wi-Fi/WFD device 4. These packets encapsulate the audio data required for playback/recording at the Wi-Fi/WFD device 4. For example, raw PCM audio packets are streamed using the RTP (Real-Time Protocol) protocol stack, where the RTP packets are sent using UDP over IP.

As previously mentioned, in one embodiment the Wi-Fi/WFD base 2 (or USB Dongle) when connected to the computing device 8 is recognized as a USB Audio device. This solution provides the benefit of not requiring special drivers in the computing device 8 to support audio streaming between the computing device 8 and the Wi-Fi/WFD device 4. In addition, the use of the Wi-Fi/WFD base 2 increases the flexibility in optimizing the communication with the Wi-Fi/WFD device 4; this is a result of having firmware access to low-level Wi-Fi chipset APIs in both the Wi-Fi/WFD base 2 and the Wi-Fi/WFD device 4. As a result it is possible to develop highly customizable firmware in both the Wi-Fi/WFD base 2 and the Wi-Fi/WFD device 4 to support increased functionalities.

Given that the Wi-Fi/WFD base 2 is recognized by the computing device 8 as a USB Audio device, any computing device audio application (e.g. Lync, Skype, etc.) can send/receive audio to/from the Wi-Fi/WFD base 2. The Wi-Fi/WFD base 2 encapsulates audio data into RTP packets which are exchanged between the Wi-Fi/WFD base 2 and the Wi-Fi/WFD device 4. In the proposed network architecture, the Wi-Fi/WFD base 2 supports the use of the Wi-Fi Direct concurrent operation mode; this means that the Wi-Fi/WFD base 2 can simultaneously communicate to an Enterprise Wi-Fi AP 12 and to the Wi-Fi/WFD device 4.

Figure 2:
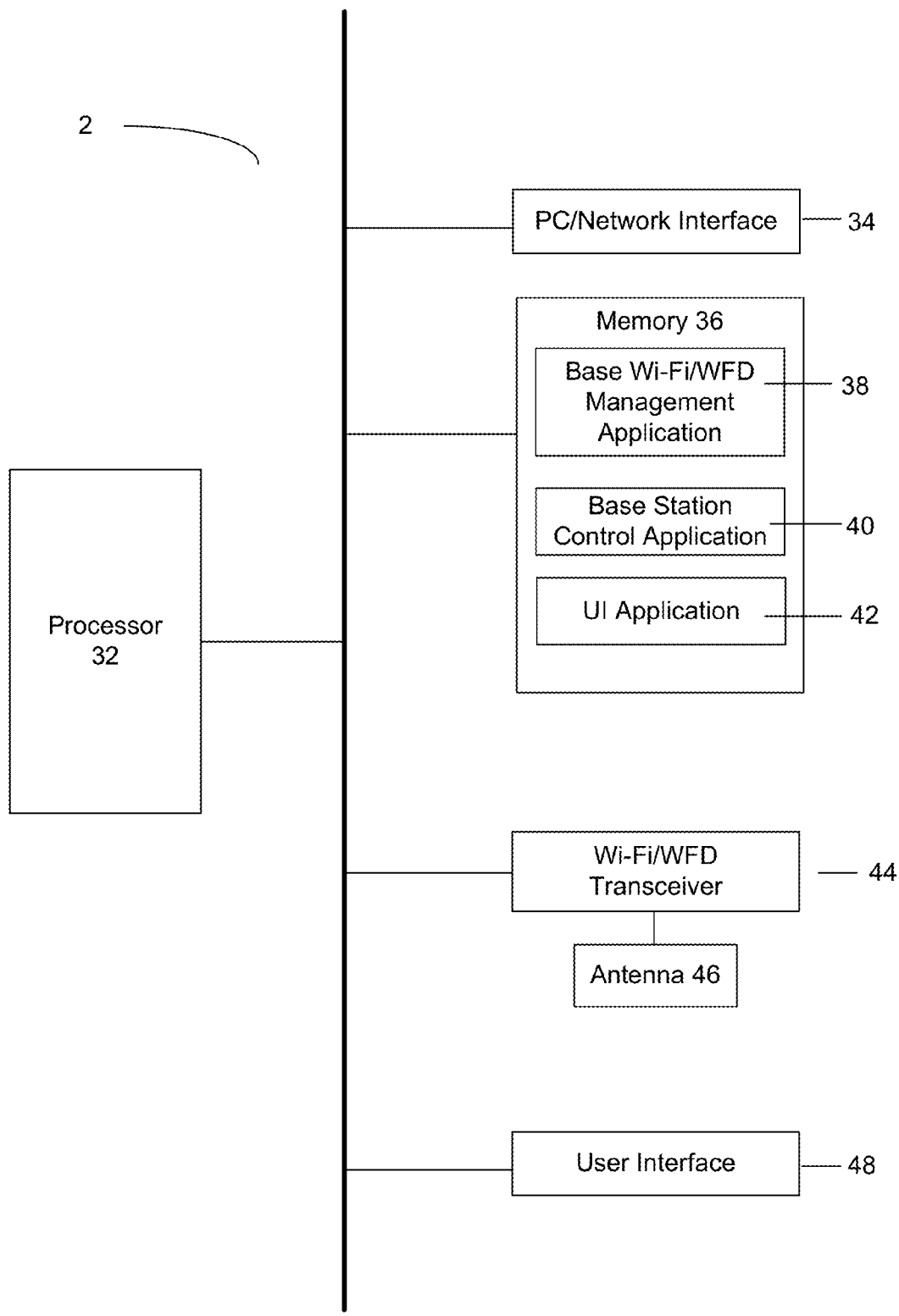
FIG. 2 illustrates a simplified block diagram of the Wi-Fi/WFD base shown in FIG. 1.

FIG. 2 illustrates a simplified block diagram of the Wi-Fi/WFD base 2 shown in FIG. 1. Wi-Fi/WFD base 2 includes a processor 32 operably coupled to a computer readable memory 36, a Wi-Fi/WFD Transceiver 44 and accompanying antenna(s) 46, PC/network interface(s) 34, and a user interface 48.

PC/network interface(s) 34 may include a personal computer interface and/or network interface. For example, the network interface may be an interface to a public switched telephone network, integrated services digital network, local area network, or wireless local area network. In one example, the PC interface is a Universal Serial Bus device operable to couple to a Universal Serial Bus port of a computing device as a Universal Serial Bus audio device.

Processor 32 allows for processing data, in particular managing Wi-Fi data between Wi-Fi/WFD Transceiver 44 and memory 36 for managing Wi-Fi operation of Wi-Fi/WFD base 2. Processor 32 may include a variety of processors (e.g., digital signal processors), with conventional CPUs being applicable.

Computer readable memory 36 may include a variety of memories, and in one example includes SDRAM, ROM, flash memory, or a combination thereof. Computer readable memory 36 may further include separate memory structures or a single integrated memory structure. In one example, computer readable memory 36 may be used to store passwords, network and telecommunications programs, and/or an operating system (OS).

Computer readable memory 36 stores a Base Wi-Fi/WFD Management application program 38 executed by processor 32 to perform operations as described herein. Memory 36 may store Wi-Fi data and operational parameters for use by Base Wi-Fi/WFD Management application program 38 to manage operation of base 2. Memory 36 also includes a base station control application 40 interfacing with Base Wi-Fi/WFD Management application program 38 and user interface application 42 to operate Wi-Fi/WFD base 2. User interface 48 allows for manual communication between the base station user and the base station, and in one example includes an audio and/or visual interface. In a further example, user interface 48 is optional.

Instructions may be provided to memory 36 from a storage device, such as a magnetic device, read-only memory, via a remote connection (e.g., over a network via PC/Network interface(s) 34) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Wi-Fi/WFD base 2 may include operating system code and specific applications code, which may be stored in non-volatile memory. For example the code may include drivers for the Wi-Fi/WFD base 2 and code for managing the drivers and a protocol stack for communicating with the PC/network interface(s) 34 and Wi-Fi/WFD Transceiver 44.

In various embodiments, the techniques of FIGS. 6-9 discussed below may be implemented as sequences of instructions executed by one or more electronic systems. The instructions may be stored by the Wi-Fi/WFD base 2 or the instructions may be received by the Wi-Fi/WFD base 2 (e.g., via a network connection), or similarly by computing device 8, Wi-Fi/WFD device 4, or distributed among any of these devices. In one example operation, Base Wi-Fi/WFD Management application program 38 is operable to transport bi-directional audio data to a wireless Wi-Fi/WFD device 4 in either Wi-Fi Direct mode or Wi-Fi mode.

Figure 3:
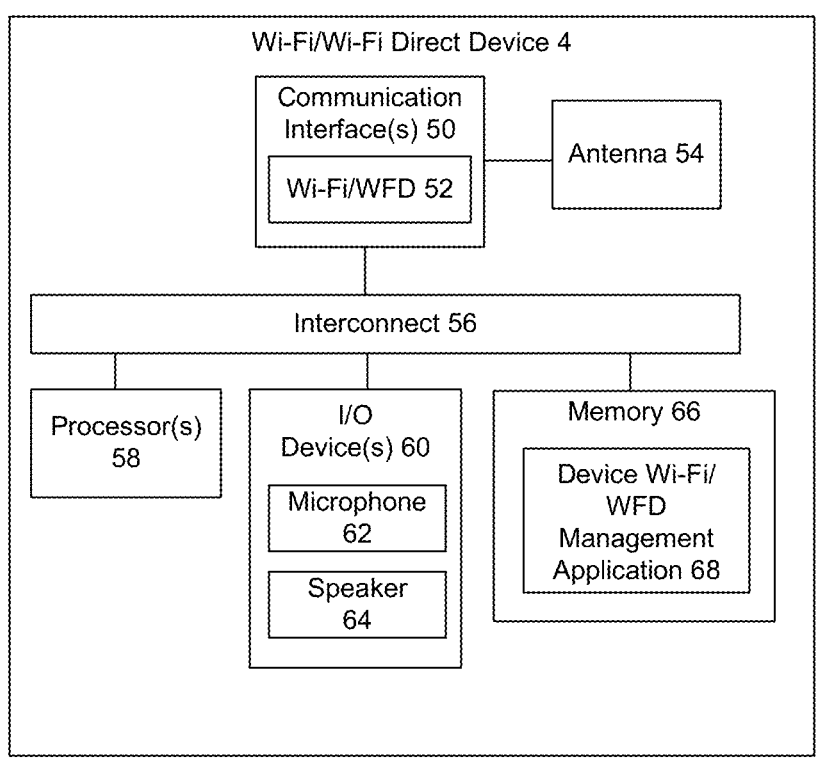
FIG. 3 illustrates a simplified block diagram of the Wi-Fi/WFD device shown in FIG. 1.

FIG. 3 illustrates a simplified block diagram of the wireless Wi-Fi/WFD device 4 shown in FIG. 1. In one example, the Wi-Fi/WFD device 4 includes a two-way RF communication device having data communication capabilities. The Wi-Fi/WFD device 4 may have the capability to communicate with other computer systems via a local or wide area network. In one example, the wireless Wi-Fi/WFD device 4 is a wireless headset which receives and transmits audio data including voice communications associated with a telephony call.

Wi-Fi/WFD device 4 includes input/output (I/O) device(s) 60 configured to interface with the user, including a microphone 62 operable to receive a user voice input or other audio. I/O device(s) 60 may also include additional input devices, such as a keyboard, touchscreen, etc., and one or more output devices, such as a display, speaker 64, etc. In some embodiments, I/O device(s) 60 may include one or more of a display device, such as a liquid crystal display (LCD), an alphanumeric input device, such as a keyboard, and/or a cursor control device, and a biometric input device. I/O device(s) 60 include a user interface operable to receive a user request to enter a device pairing mode.

The Wi-Fi/WFD device 4 includes a processor 58 configured to execute code stored in a memory 66. While only a single processor 58 is shown, Wi-Fi/WFD device 4 may include multiple processors and/or co-processors, or one or more processors having multiple cores. The processor 58 and memory 66 may be provided on a single application-specific integrated circuit, or the processor 58 and the memory 66 may be provided in separate integrated circuits or other circuits configured to provide functionality for executing program instructions and storing program instructions and other data, respectively. Memory 66 may include both volatile and non-volatile memory such as random access memory (RAM) and read-only memory (ROM). Memory 66 also may be used to store temporary variables or other intermediate information during execution of instructions by processor 58. For example, memory 66 may include Wi-Fi data and Wi-Fi operational parameters. Memory 66 stores a device Wi-Fi/WFD Management application 68 executed by the processor 58 to perform operations as described herein.

Wi-Fi/WFD device 4 includes communication interface(s) 50, one or more of which may utilize antenna(s) 54. The communications interface(s) 50 may also include other processing means, such as a digital signal processor and local oscillators. In one example, communications interface(s) 50 include one or more short-range wireless communications subsystems which provide communication between Wi-Fi/WFD device 4 and different systems or devices. The short-range communications subsystem includes a Wi-Fi/WFD subsystem 52.

In further example, the short range communications system may also include an infrared device and associated circuit components for short-range communication, a near field communications (NFC) subsystem, or a Bluetooth subsystem including a transceiver. Interconnect 56 may communicate information between the various components of Wi-Fi/WFD device 4.

Instructions may be provided to memory 66 from a storage device, such as a magnetic device, read-only memory, via a remote connection (e.g., over a network via communication interface(s) 50) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Wi-Fi/WFD device 4 may include operating system code and specific applications code, which may be stored in non-volatile memory. For example the code may include drivers for the Wi-Fi/WFD device 4 and code for managing the drivers and a protocol stack for communicating with the communications interface(s) 50 which may include a receiver and a transmitter and is connected to an antenna 54. Communication interface(s) 50 provides a wireless interface for communication with Wi-Fi/WFD device 4.

Communication interface(s) 50 may provide access to a network, such as a local area network. Communication interface(s) 50 may include, for example, a wireless network interface having antenna 54, which may represent one or more antenna(e). Communication interface(s) 50 may provide access to a local area network and/or a personal area network, for example, by conforming to Bluetooth standards. In addition, communication via wireless LAN standards, communication interface(s) 50 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In various examples, Wi-Fi/WFD device 4 represents a range of electronic devices, for example, headsets, computer systems, tablet computers, smartphones, laptops, PDAs, cellular telephones, etc. In certain cases, such as where Wi-Fi/WFD device 4 is a wireless headset, the device may have a limited user interface (e.g., no display or reduced user input buttons). The specific design and implementation of the communications interfaces of the Wi-Fi/WFD device 4 is dependent upon the communication networks in which the devices are intended to operate.

In one example operation, device Wi-Fi/WFD Management application 68 is operable to receive a signal strength indication (e.g., RSSI) between the Wi-Fi/WFD device 4 and the Wi-Fi/WFD base 2. Responsive to the signal strength, Wi-Fi/WFD Management application 68 causes Wi-Fi/WFD device 4 to either transport bi-directional audio data directly from the Wi-Fi/WFD base 2 over a Wi-Fi Direct communications link 6 between the wireless Wi-Fi/WFD device 4 and the Wi-Fi/WFD base 2, or transport bi-directional audio data from the Wi-Fi/WFD base 2 utilizing one or more Wi-Fi Access Points 12.

In one example, receiving the audio data from the Wi-Fi/WFD base 2 utilizing one or more Wi-Fi Access Points 12 includes forming a Wi-Fi link 16 between the wireless Wi-Fi/WFD device 4 and a Wi-Fi AP 12. The Wi-Fi link 16 between the wireless Wi-Fi/WFD device 4 and the Wi-Fi AP 12 is concurrent with the Wi-Fi Direct communications link 6 between the wireless Wi-Fi/WFD device 4 and the Wi-Fi/WFD base 2 during an initial transition period. The device Wi-Fi/WFD Management application 68 includes instructions which cause the wireless Wi-Fi/WFD device 4 to transmit a handoff message to the Wi-Fi/WFD base 2 over the Wi-Fi Direct communications link 6, wherein the handoff message includes a wireless Wi-Fi/WFD device Internet Protocol address for use with a Wi-Fi AP 12.

Referring again to FIG. 1, in one example operation, bi-directional audio data is transported between a wireless Wi-Fi/WFD device 4 and a Wi-Fi/WFD base 2 over a Wi-Fi Direct communications link 6 between the wireless Wi-Fi/WFD device 4 and the Wi-Fi/WFD base 2. A reduced signal quality of the Wi-Fi Direct communications link 6 is detected by the Wi-Fi/WFD device 4. For example, detecting the reduced signal quality of the Wi-Fi Direct communications link 6 includes detecting a Received Signal Strength Indication below a threshold value. In one example, the detection of Received Signal Strength Indication is triggered by information provided by a motion sensor; the data is received from a motion sensor at the wireless Wi-Fi/WFD device 4 and a motion of the wireless Wi-Fi/WFD device 4 is identified. For example, the motion sensor may be an accelerometer.

A Wi-Fi link 16 is formed by wireless Wi-Fi/WFD device 4 with a Wi-Fi AP 12, the wireless Wi-Fi/WFD device 4 operating in a Wi-Fi Direct concurrent mode, wherein the Wi-Fi link 16 is concurrent with the Wi-Fi Direct communications link 6. Bi-directional audio data is transported between the Wi-Fi/WFD base 2 and the wireless Wi-Fi/WFD device 4 over the Wi-Fi link 16. The Wi-Fi AP 12 is one of a plurality of networked enterprise Access Points. The wireless Wi-Fi/WFD device 4 utilizes concurrently both a first private Internet Protocol address (with Wi-Fi Direct communications link 6 to Wi-Fi/WFD base 2) and a second non-private Internet Protocol address (with Wi-Fi link 16 to Wi-Fi AP 12) when the Wi-Fi link 16 is concurrent with the Wi-Fi Direct communications link 6.

In one example operation, a handoff message is received at the Wi-Fi/WFD base 2 from the wireless Wi-Fi/WFD device 4 over a private network using the Wi-Fi Direct communications link 6 between the wireless Wi-Fi/WFD device 4 and the Wi-Fi/WFD base 2, the handoff message including a wireless Wi-Fi/WFD device private and non-private Internet Protocol addresses. A Wi-Fi link 18 is formed between the Wi-Fi/WFD base 2 and a Wi-Fi AP 12, the Wi-Fi/WFD base 2 operating in a Wi-Fi Direct concurrent mode, wherein the Wi-Fi link 18 between the Wi-Fi/WFD base 2 is concurrent with the Wi-Fi Direct communications link 6 between the wireless Wi-Fi/WFD device 4 and the Wi-Fi/WFD base 2. The audio data is rerouted from the Wi-Fi/WFD base 2 over the Wi-Fi Direct communications link 6 between the wireless Wi-Fi/WFD device 4 and the Wi-Fi/WFD base 2 to the Wi-Fi link 18 between the Wi-Fi/WFD base 2 and the Wi-Fi AP 12. The Wi-Fi Direct communications link 6 between the wireless Wi-Fi/WFD device 4 and the Wi-Fi/WFD base 2 is terminated.

In one example, an increased signal quality is detected between the wireless Wi-Fi/WFD device 4 and the Wi-Fi/WFD base 2. A reestablished Wi-Fi Direct communications link 6 is formed between the wireless Wi-Fi/WFD device 4 and the Wi-Fi/WFD base 2. The bi-directional audio data is transported between the wireless Wi-Fi/WFD device 4 and the Wi-Fi/WFD base 2 over the reestablished Wi-Fi Direct communications link 6.

Figure 4:
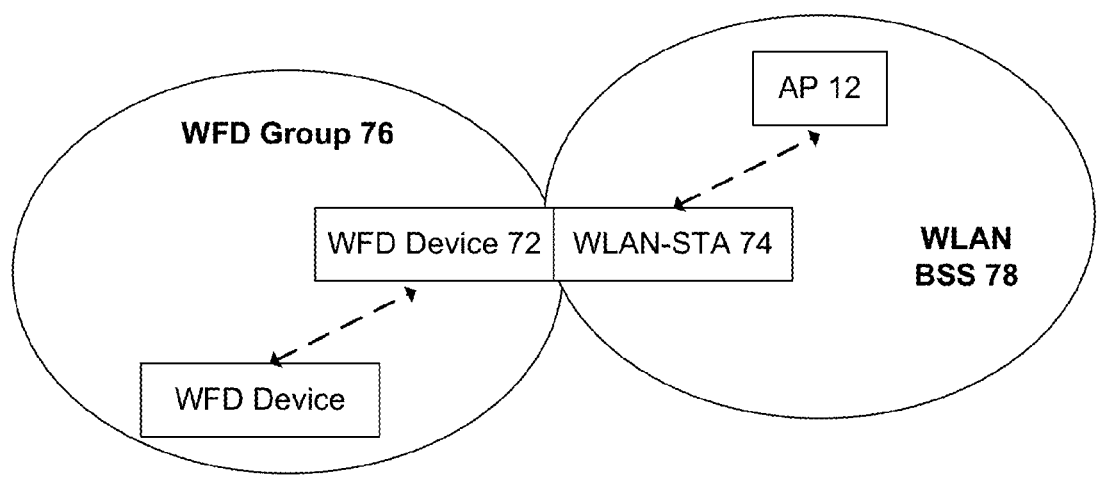
FIG. 4 illustrates Wi-Fi Direct concurrent operation mode.

FIG. 4 illustrates Wi-Fi Direct concurrent operation mode. In this figure it can be observed that a Wi-Fi Direct device operating in concurrent mode behaves as a WFD Device 72 and a Wireless LAN Station (WLAN-STA) 74; as a result, the device operates in two disjoint wireless domains at the same time, i.e. the WFD Group 76 and the Wi-Fi LAN Basic Service Set (WLAN BSS) 78.

For communication with the Wi-Fi/WFD device 4, the Wi-Fi/WFD base 2 behaves as a Wi-Fi Direct Group Owner (WFD-GO). While operating as a WFD-GO, the Wi-Fi/WFD base 2 behaves like a Software Access Point (Soft-AP) and other WFD or Wi-Fi devices can connect to the WFD-GO. Similarly the Wi-Fi/WFD device 4 also employs the Wi-Fi Direct concurrent operation mode, so it is also possible for the Wi-Fi/WFD device 4 to have a simultaneous communication with an Enterprise Access Point (AP) and a communication link with the Wi-Fi/WFD base.

Referring to FIG. 1, while the Wi-Fi/WFD base 2 and the Wi-Fi/WFD device 4 are within wireless signal range, neither of them connect with an Enterprise Wi-Fi AP 12. In this figure, the computing device 8 has a Wi-Fi link with the Enterprise AP via the computing device 8's Wi-Fi wireless adapter, and this connection is used by the computing device 8 for standard networking functionalities. On the other hand, the Wi-Fi/WFD base 2 operates in WFD concurrent mode and it only enables the Peer-to-Peer Wi-Fi link for communication with the Wi-Fi/WFD device 4; this is achieved while the Wi-Fi/WFD base 2 operates as a Wi-Fi Direct Group Owner. This approach has the benefit of reducing the traffic load in the Wi-Fi Enterprise data network 14, as the Enterprise Wi-Fi APs 12 are not used for audio data streaming. This feature helps improve performance in high density environments.

Figure 5:
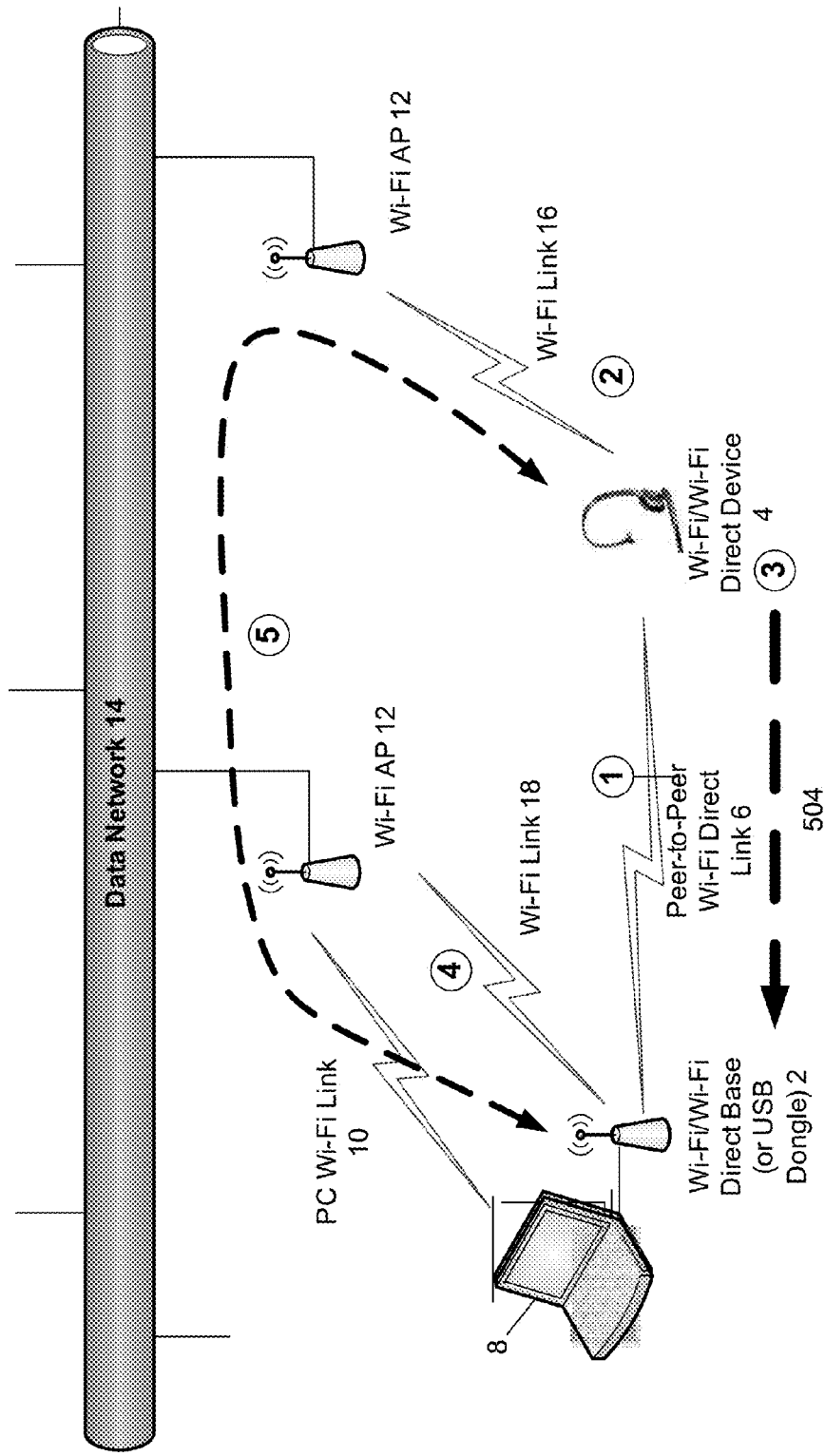
FIG. 5 illustrates a roaming process for a Wi-Fi/WFD device in one usage scenario of the system shown in FIG. 1.

However, this networking topology introduces some challenges that must be addressed. The WFD link between the Wi-Fi/WFD base 2 and the Wi-Fi/WFD device 4 is part of a private network and is active in a sub-network which is not the same as the Wi-Fi Enterprise sub-network which is considered a non-private network. Referring again to FIG. 4, recall that the WFD Group 76 and the WLAN BSS 78 are two different networking domains. This situation has the following implications: (a) Both the Wi-Fi/WFD base 2, and the Wi-Fi/WFD device 4 have private IP addresses which are only valid in the Peer-to-Peer Sub-network (i.e. the WFD Group network domain), and (b) Both the Wi-Fi/WFD base 2, and the Wi-Fi/WFD device 4 have not been authenticated by the Wi-Fi Enterprise network 14 (i.e. the WLAN BSS network domain). When the Wi-Fi/WFD base 2, or the Wi-Fi/WFD device 4 connect to the Wi-Fi Enterprise network 14 they will incur high latencies as full association/authentication needs to take place for the Wi-Fi Enterprise network 14 to accept the connection. The methods and apparatuses described herein are novel in the way it handles and solves the networking issues described above. FIG. 5 illustrates the stages that take place during this roaming process in one example.

FIG. 5 illustrates a roaming process for a Wi-Fi/WFD device 4 in one usage scenario of the system shown in FIG. 1. Initially the Wi-Fi/WFD device 4 is in close proximity of the Wi-Fi/WFD base 2 and a Peer-to-Peer Wi-Fi Direct communications link 6 is active between the two devices, and both devices are members of a private network, as illustrated in FIG. 1. As the Wi-Fi/WFD device 4 moves away from the Wi-Fi/WFD base 2, the received signal strength (RSS) is reduced; this is denoted in FIG. 5, step 1. A handoff algorithm in the Wi-Fi/WFD device 4 is used to make a decision to start the handoff process. The algorithm for the WFD to Wi-Fi handoff in one example is illustrated in the flow chart presented in FIG. 8. Embedded sensors in the Wi-Fi/WFD device 4 will provide contextual information to detect Wi-Fi/WFD device 4 motion. The Wi-Fi/WFD device 4 motion detection algorithm is based on embedded sensors and the Wi-Fi signal. Once Wi-Fi/WFD device 4 motion has been detected, the device will start to monitor the received signal strength (e.g., Received Signal Strength Indication (RSSI)). As the RSSI falls below a Threshold, the Wi-Fi/WFD device 4 Wi-Fi adapter will connect to an Enterprise AP 12, and the Wi-Fi/WFD device 4 becomes a member of a non-private Data Network 14, this is denoted in FIG. 5, step 2. It should be noted that the Wi-Fi/WFD device 4 Wi-Fi adapter is working in WFD concurrent mode; this implies that the current active connection to the Wi-Fi/WFD base 2 is active and audio data packets are still being exchanged between the Wi-Fi/WFD base 2 and the Wi-Fi/WFD device 4 over the private network using the Peer-to-Peer Wi-Fi Direct Link 6. At this point the Wi-Fi/WFD device 4 will have an active Wi-Fi link 16 to the Wi-Fi Enterprise network (with a valid Enterprise IP address in the non-private Data Network 14) and an active Peer-to-Peer Wi-Fi Direct communications link 6 (with a private IP address in the private network).

The Wi-Fi/WFD device 4 will signal to the Wi-Fi/WFD base 2 that a handoff is about to take place; this is denoted in FIG. 5, step 3. To achieve this, the Wi-Fi/WFD device 4 will send a message to the Wi-Fi/WFD base 2. This message includes the Wi-Fi/WFD device 4 Enterprise IP address used in the non-private Data Network 14, which is required at a later stage for the Wi-Fi/WFD base 2 to redirect audio data to the Wi-Fi/WFD device 4 over the Enterprise network.

Upon reception of the handoff message, the Wi-Fi/WFD base 2 will proceed to connect to the Wi-Fi Enterprise network, thus becoming a member of the non-private Data Network 14; this is denoted in FIG. 5, step 4. As a result the Wi-Fi/WFD base 2 will now have an active Wi-Fi link 18 to the Wi-Fi Enterprise network (with a valid Enterprise IP Address in the non-private Data Network 14) and a Peer-to-Peer Wi-Fi Direct communications link 6 (with a private IP address in the private network).

The Wi-Fi/WFD base 2 now opens a network communication link toward the Wi-Fi/WFD device 4 (i.e. using the Wi-Fi/WFD device 4 Enterprise IP address as the destination end-point) over the Wi-Fi Enterprise network and begins to redirects audio data traffic from the previous Peer-to-Peer Wi-Fi Direct communications link 6 using the Wi-Fi link 18; this is denoted in FIG. 5, step 5. It should be noted that this audio communication path over the Enterprise network is bi-directional. At this point the previous communication link over the Peer-to-Peer wireless path can be closed in both the Wi-Fi/WFD base 2 and the Wi-Fi/WFD device 4, thus terminating the Wi-Fi Direct communications link 16.

Additional vertical handoffs from the Wi-Fi/WFD device 4 between Enterprise Wi-Fi APs 12 are handled by the 802.11 standard handoff mechanisms at the Data Link Layer (i.e. Layer 2 in the OSI model).

As the Wi-Fi/WFD device 4 moves back within signal coverage of the Wi-Fi/WFD base 2, the Wi-Fi/WFD device 4 will begin to detect the Wi-Fi/WFD base 2 Wi-Fi Beacon signal. In one embodiment, the algorithm for the Wi-Fi to WFD handoff is illustrated in the flow chart presented in FIG. 9.

At this point the Wi-Fi/WFD device 4 will connect to the Wi-Fi/WFD base 2 and establish a Peer-to-Peer Wi-Fi Direct Link 6. As the Wi-Fi/WFD device 4 is now directly connected to the Wi-Fi/WFD base 2 it gets a private IP address from the Wi-Fi/WFD base 2 using DHCP, so the Wi-Fi/WFD base 2 knows the private IP address of the Wi-Fi/WFD device 4. The Wi-Fi/WFD base 2 then opens a communication link with the Wi-Fi/WFD device 4 over the Peer-to-Peer Wi-Fi Direct communications link 6 and begins to redirect audio data over the Peer-to-Peer Wi-Fi Direct communications link 6. At this point the previous communication link over the Wi-Fi Enterprise path can be closed, and both the Wi-Fi/WFD base 2 and the Wi-Fi/WFD device 4 can disconnect from the Wi-Fi Enterprise infrastructure, thus terminating the Wi-Fi communications links 18 and Wi-Fi communications link 16.

Figure 6A:
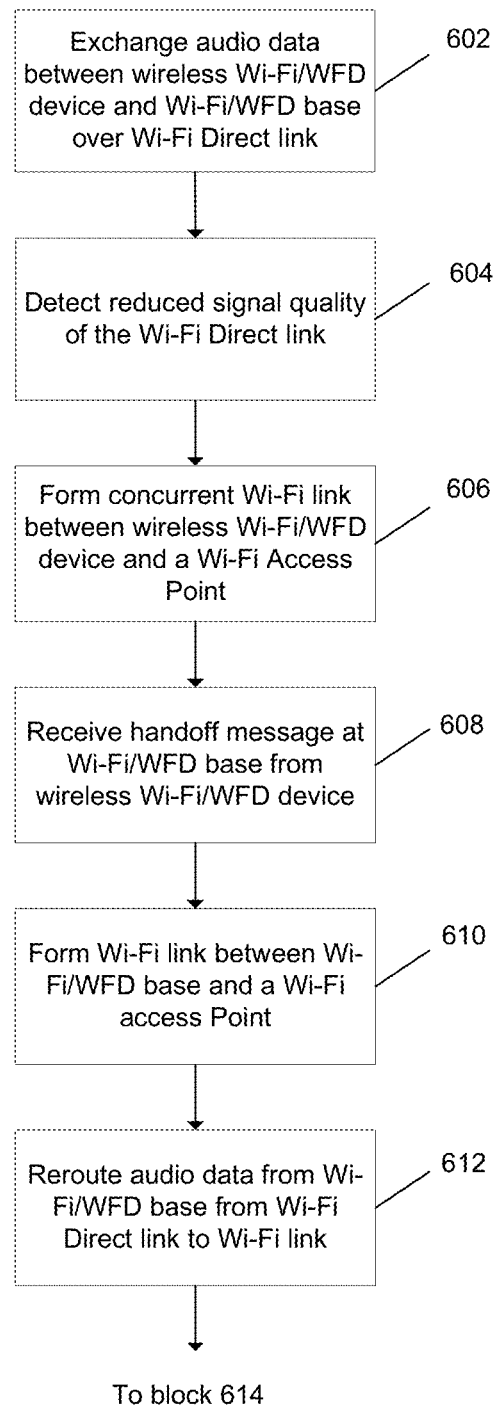
FIGS. 6A and 6B are a flow diagram illustrating a process for operating a Wi-Fi/WFD device in a Wi-Fi network in one example.
Figure 6B:
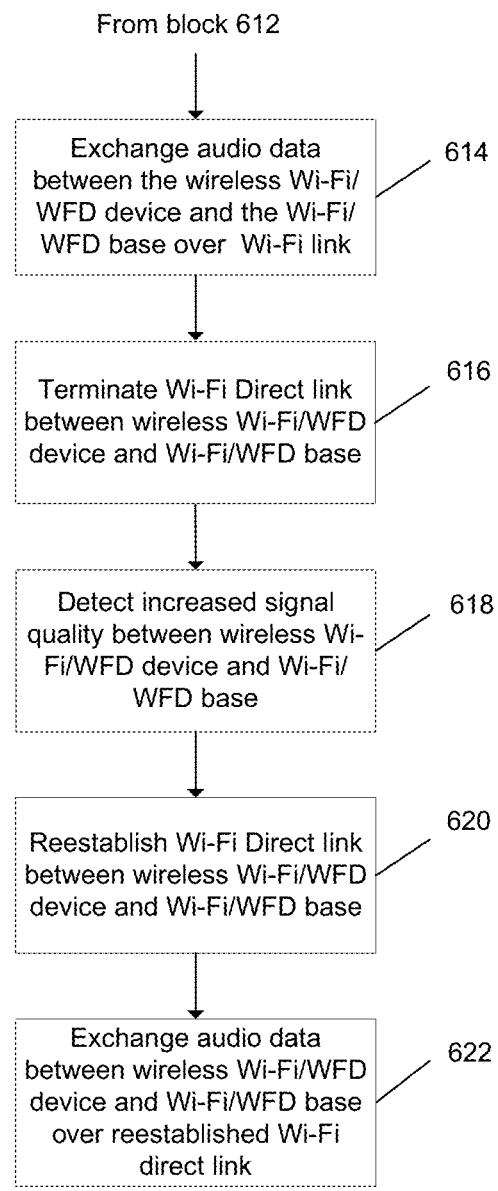

FIGS. 6A and 6B are a flow diagram illustrating a process for operating a Wi-Fi/WFD device in a Wi-Fi network in one example. At block 602, audio data is exchanged between a wireless Wi-Fi/WFD device and a Wi-Fi/WFD base over a Wi-Fi Direct communications link between the wireless Wi-Fi/WFD device and the Wi-Fi/WFD base. In one example, the wireless Wi-Fi/WFD device is a wireless headset and the audio data comprises voice communications associated with a telephony call. In one example, the Wi-Fi/WFD base is a Universal Serial Bus device operable to couple to a Universal Serial Bus port of a computing device as a Universal Serial Bus audio device.

At block 604, a reduced signal quality of the Wi-Fi Direct communications link is detected. For example, detecting the reduced signal quality of the Wi-Fi Direct communications link includes detecting a Received Signal Strength Indication below a threshold value. In one example, data is received from a motion sensor at the wireless Wi-Fi/WFD device and a motion of the wireless Wi-Fi/WFD device is identified. The identified motion and the reduced signal quality of the Wi-Fi Direct communications link may be utilized to identify motion of the Wi-Fi/WFD device away from the Wi-Fi/WFD base.

At block 606, a Wi-Fi communications link between the wireless Wi-Fi/WFD device and a Wi-Fi Access Point is formed, the wireless Wi-Fi/WFD device operating in a Wi-Fi Direct concurrent mode, wherein the Wi-Fi communications link is concurrent with the Wi-Fi Direct communications link. In one example, the wireless Wi-Fi/WFD device utilizes concurrently both a first Internet Protocol address and a second Internet Protocol address when the Wi-Fi communications link is concurrent with the Wi-Fi Direct communications link. In one example, the Wi-Fi Access Point is one of a plurality of networked enterprise Access Points.

At block 608, a handoff message is received at the Wi-Fi/WFD base from the wireless Wi-Fi/WFD device, the handoff message including a the wireless Wi-Fi/WFD device Internet Protocol first address and second address. At block 610, a Wi-Fi communications link is formed between the Wi-Fi/WFD base and a Wi-Fi Access Point. The Wi-Fi/WFD base operates in a Wi-Fi Direct concurrent mode, wherein the Wi-Fi communications link between the Wi-Fi/WFD base is concurrent with the Wi-Fi Direct communications link between the wireless Wi-Fi/WFD device and the Wi-Fi/WFD base.

At block 612, the audio data from the Wi-Fi/WFD base over the Wi-Fi Direct communications link between the wireless Wi-Fi/WFD device and the Wi-Fi/WFD base is rerouted to the Wi-Fi communications link between the Wi-Fi/WFD base and the Wi-Fi Access Point. At block 614, audio data is exchanged between the Wi-Fi/WFD base and the wireless Wi-Fi/WFD device over a Wi-Fi communications link. At block 616, the Wi-Fi Direct communications link between the wireless Wi-Fi/WFD device and the Wi-Fi/WFD base is terminated.

At block 618, an increased signal quality between the wireless Wi-Fi/WFD device and the Wi-Fi/WFD base is detected. At block 620, a reestablished Wi-Fi Direct communications link is formed between the wireless Wi-Fi/WFD device and the Wi-Fi/WFD base. At block 622, the audio data is exchanged between the wireless Wi-Fi/WFD device and the Wi-Fi/WFD base over the reestablished Wi-Fi Direct communications link.

Figure 7:
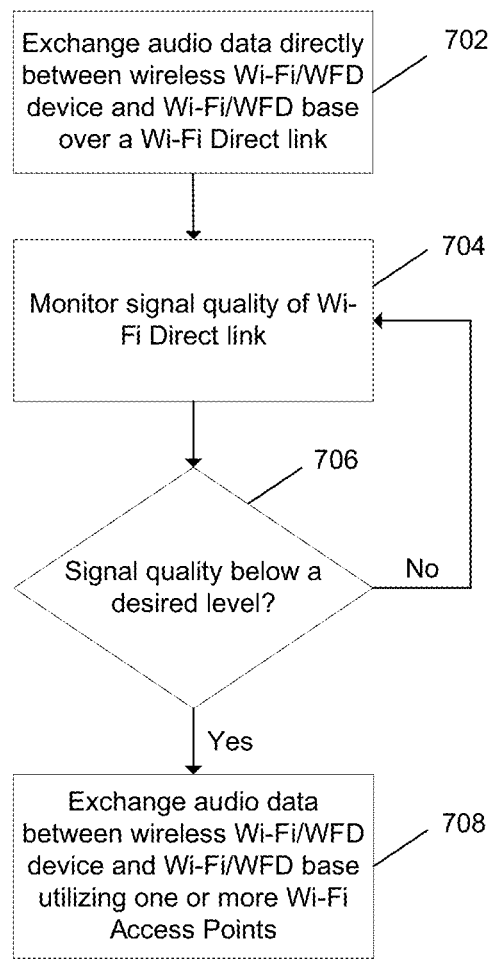
FIG. 7 is a flow diagram illustrating a process for operating a Wi-Fi/WFD device in a Wi-Fi network in a further example.

FIG. 7 is a flow diagram illustrating a process for operating a Wi-Fi/WFD device in a Wi-Fi network in a further example. At block 702, an audio data is exchanged between a wireless Wi-Fi/WFD device and a Wi-Fi/WFD base over a Wi-Fi Direct communications link between the wireless Wi-Fi/WFD device and the Wi-Fi/WFD base. In one example, the Wi-Fi/WFD base is a Universal Serial Bus device operable to couple to a Universal Serial Bus port of a computing device as a Universal Serial Bus audio device.

At block 704, a signal quality of the Wi-Fi Direct communications link is monitored. At decision block 706 it is determined whether the signal quality of the Wi-Fi Direct communications link is below a desired level. If no at decision block, 706, the process returns to block 704.

If yes at decision block 706, at block 708, an audio data is transmitted between the wireless Wi-Fi/WFD device and the Wi-Fi/WFD base utilizing one or more Wi-Fi Access Points. In one example, a handoff message is received at the Wi-Fi/WFD base from the wireless Wi-Fi/WFD device, the handoff message including a wireless Wi-Fi/WFD device Internet Protocol address for transmitting the audio data between the wireless Wi-Fi/WFD device and the Wi-Fi/WFD base utilizing the one or more Wi-Fi Access Points.

In one example, the one or more Wi-Fi Access Points include a first Wi-Fi Access Point and a second Wi-Fi Access Point, the method further comprising. A first wireless link is formed between the wireless Wi-Fi/WFD device and the first Wi-Fi Access Point. A second wireless link is formed between the Wi-Fi/WFD base and the second Wi-Fi Access Point. In one example, the process further includes terminating the Wi-Fi Direct communications link between the wireless Wi-Fi/WFD device and the Wi-Fi/WFD base.

In one example, the process further includes detecting an increased signal quality between the wireless Wi-Fi/WFD device and the Wi-Fi/WFD base. The increased signal quality corresponds to movement of the Wi-Fi/WFD device towards the Wi-Fi/WFD base. A reestablished Wi-Fi Direct communications link is formed between the wireless Wi-Fi/WFD device and the Wi-Fi/WFD base. The audio data is exchanged between the wireless Wi-Fi/WFD device and the Wi-Fi/WFD base over the reestablished Wi-Fi Direct communications link. The Wi-Fi links using the Wi-Fi Access Points are then terminated.

Figure 8:
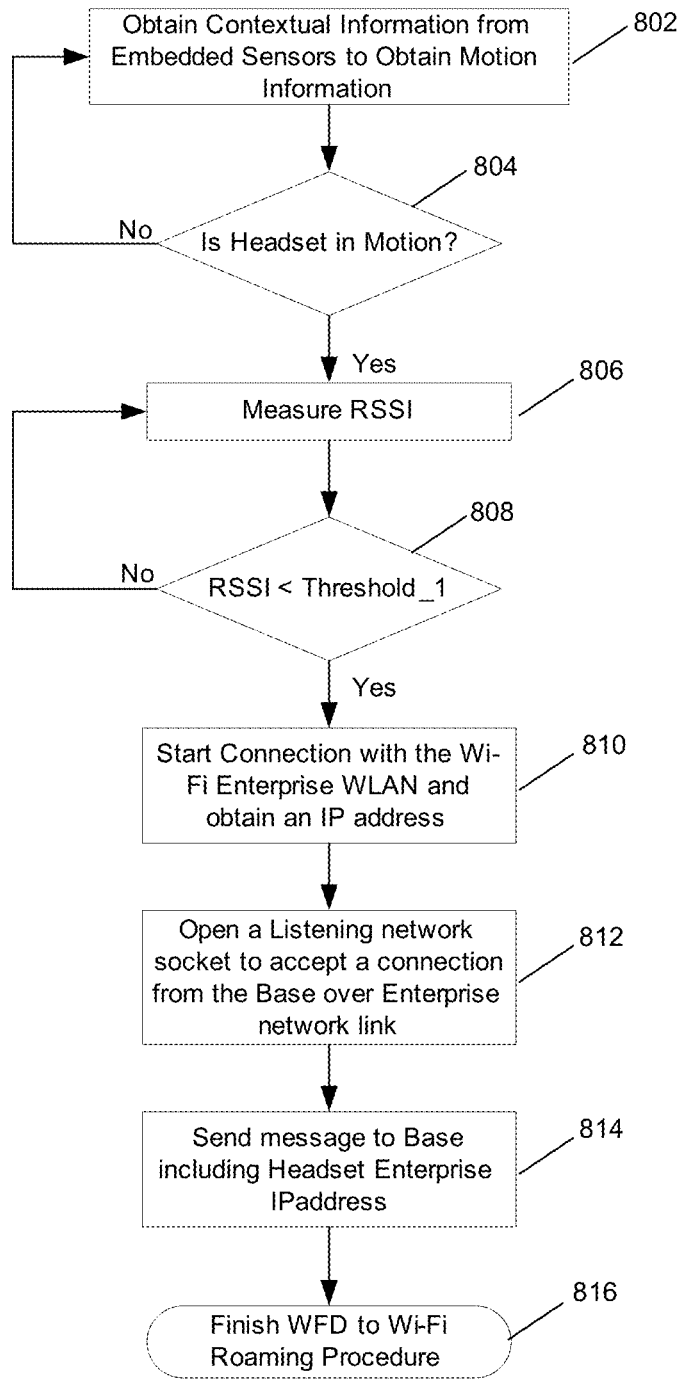
FIG. 8 is a flow diagram illustrating a roaming process of a Wi-Fi/WFD device in one example.

FIG. 8 is a flow diagram illustrating a roaming process of a Wi-Fi/WFD device (e.g., a headset) in one example. At block 802, contextual information is obtained from headset embedded sensors to obtain motion information. At decision block 804 it is determined whether the headset is in motion. If no at decision block 804, the process returns to block 802. If yes at decision block 804, at block 806 the RSSI is obtained.

At decision block 808 it is determined whether the RSSI is less than a threshold value (e.g., a Threshold_1 value). If no at decision block 804, the process returns to block 806. If yes at decision block 808, at block 810 the headset initiates a connection with a Wi-Fi enterprise WLAN and obtains an IP address.

At block 812, a listening network socket is opened to accept a connection from the Base over the enterprise network link. At block 814, a message is sent to the Base including the headset enterprise IP address. At block 816, the Wi-Fi Direct to Wi-Fi roaming procedure is finished.

Figure 9:
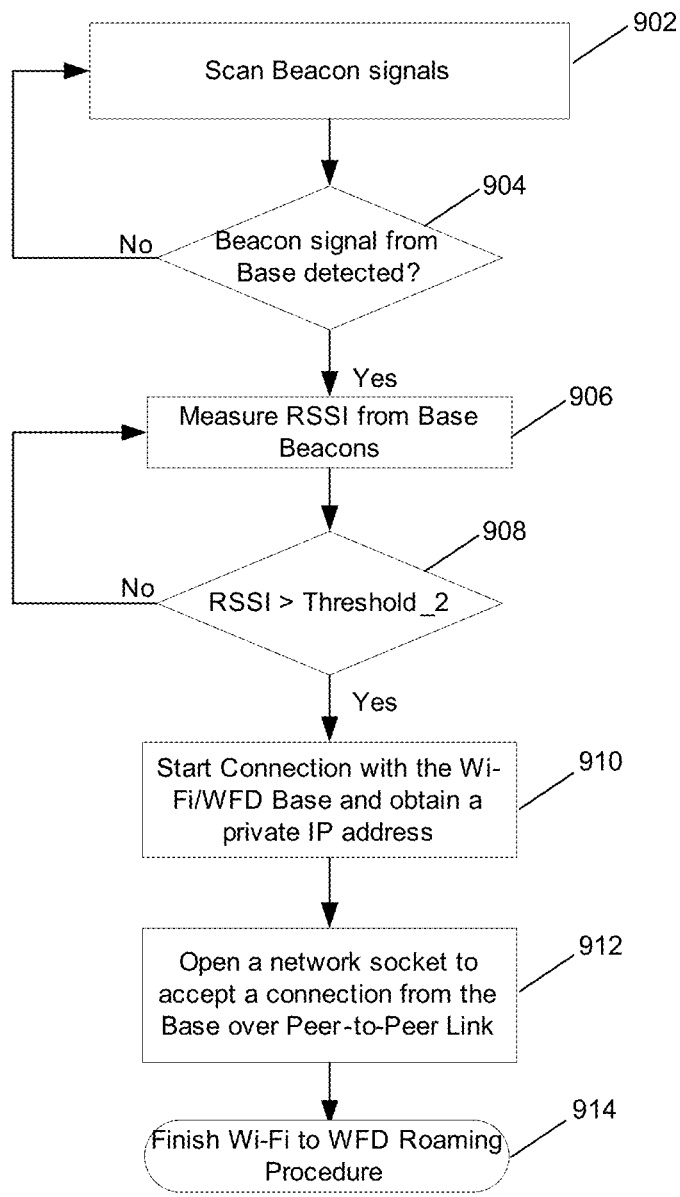
FIG. 9 is a flow diagram illustrating a roaming process of a Wi-Fi/WFD device in a further example.

FIG. 9 is a flow diagram illustrating a roaming process of a Wi-Fi/WFD device in a further example. At block 902, beacon signals are scanned by the Wi-Fi/WFD device. At decision block 904, it is determined whether a beacon signal from a Base has been detected. If no at decision block 904, the process returns to block 902. If yes at decision block 904, at block 906 the RSSI is measured from the Base beacons.

At decision block 908, it is determined whether the RSSI is greater than a predetermined threshold value (e.g., a Threshold_2 value). If no at decision block 908, the process returns to block 906. If yes at decision block 908, at block 910 a peer-to-peer Wi-Fi Direct connection is initiated with the Base and a private IP address is obtained.

At block 912, a network socket is opened to accept a connection from the Base over the peer-to-peer Wi-Fi Direct link. At block 914, the Wi-Fi to Wi-Fi Direct roaming procedure is finished.

While the exemplary embodiments of the present invention are described and illustrated herein, it will be appreciated that they are merely illustrative and that modifications can be made to these embodiments without departing from the spirit and scope of the invention. For example, methods, techniques, and apparatuses described as applying to one embodiment or example may also be utilized with other embodiments or examples described herein. Thus, the scope of the invention is intended to be defined only in terms of the following claims as may be amended, with each claim being expressly incorporated into this Description of Specific Embodiments as an embodiment of the invention.

What is claimed is:

1. A method comprising:
receiving an audio data at a wireless Wi-Fi and Wi-Fi Direct device from a Wi-Fi and Wi-Fi Direct base over a Wi-Fi Direct communications link between the wireless Wi-Fi and Wi-Fi Direct device and the Wi-Fi and Wi-Fi Direct base;
detecting a reduced signal quality of the Wi-Fi Direct communications link;
forming a Wi-Fi communications link between the wireless Wi-Fi and Wi-Fi Direct device and a Wi-Fi Access Point following detecting the reduced signal quality of the Wi-Fi Direct communications link, the wireless Wi-Fi and Wi-Fi Direct device operating in a Wi-Fi Direct concurrent mode, wherein the Wi-Fi communications link is concurrent with the Wi-Fi Direct communications link; and
receiving the audio data at the wireless Wi-Fi and Wi-Fi Direct device over the Wi-Fi communications link.

2. The method of claim 1, further comprising:
receiving an audio data at the Wi-Fi and Wi-Fi Direct base from the wireless Wi-Fi and Wi-Fi Direct device over the Wi-Fi Direct communications link between the wireless Wi-Fi and Wi-Fi Direct device and the Wi-Fi and Wi-Fi Direct base; and
receiving audio data at the Wi-Fi Access Point from the wireless Wi-Fi and Wi-Fi Direct device.

3. The method of claim 1, wherein receiving the audio data at the wireless Wi-Fi and Wi-Fi Direct device from the Wi-Fi and Wi-Fi Direct base over the Wi-Fi Direct communications link utilizes a private network and receiving audio data at the wireless Wi-Fi and Wi-Fi Direct device over the Wi-Fi communications link utilizes a non-private network.

4. The method of claim 1, wherein the wireless Wi-Fi and Wi-Fi Direct device is a wireless headset and the audio data comprises voice communications associated with a telephony or voice-over Internet Protocol call.

5. The method of claim 1, wherein the Wi-Fi and Wi-Fi Direct base comprises a Universal Serial Bus device operable to couple to a Universal Serial Bus port of a computing device as a Universal Serial Bus audio device.

6. The method of claim 1, wherein the Wi-Fi Access Point is one of a plurality of networked enterprise Access Points.

7. The method of claim 1, further comprising receiving data from a motion sensor at the wireless Wi-Fi and Wi-Fi Direct device and identifying a motion of the wireless Wi-Fi and Wi-Fi Direct device, wherein detecting the reduced signal quality of the Wi-Fi Direct communications link comprises detecting a Received Signal Strength Indication below a threshold value.

8. The method of claim 1, wherein receiving audio data at the wireless Wi-Fi and Wi-Fi Direct device over the Wi-Fi communications link comprises receiving audio data originating from the Wi-Fi and Wi-Fi Direct base over a non-private network.

9. The method of claim 1, wherein the wireless Wi-Fi and Wi-Fi Direct device utilizes concurrently both a first private Internet Protocol address and a second non-private Internet Protocol address when the Wi-Fi communications link is concurrent with the Wi-Fi Direct communications link.

10. The method of claim 1, wherein the method further comprises:
receiving a handoff message at the Wi-Fi and Wi-Fi Direct base from the wireless Wi-Fi and Wi-Fi Direct device, the handoff message comprising a wireless Wi-Fi and Wi-Fi Direct device private Internet Protocol address and a second non-private Internet Protocol address;
forming a Wi-Fi communications link between the Wi-Fi and Wi-Fi Direct base and a Wi-Fi Access Point, the Wi-Fi and Wi-Fi Direct base operating in a Wi-Fi Direct concurrent mode, wherein the Wi-Fi communications link between the Wi-Fi and Wi-Fi Direct base and the Wi-Fi Access Point is concurrent with the Wi-Fi Direct communications link between the wireless Wi-Fi and Wi-Fi Direct device and the Wi-Fi and Wi-Fi Direct base; and
rerouting the audio data from the Wi-Fi and Wi-Fi Direct base over the Wi-Fi Direct communications link between the wireless Wi-Fi and Wi-Fi Direct device and the Wi-Fi and Wi-Fi Direct base to the Wi-Fi communications link between the Wi-Fi and Wi-Fi Direct base and the Wi-Fi Access Point; and
terminating the Wi-Fi Direct communications link between the wireless Wi-Fi and Wi-Fi Direct device and the Wi-Fi and Wi-Fi Direct base.

11. The method of claim 1, further comprising:
terminating the Wi-Fi Direct communications link between the wireless Wi-Fi and Wi-Fi Direct device and the Wi-Fi and Wi-Fi Direct base;
detecting an increased signal quality between the wireless Wi-Fi and Wi-Fi Direct device and the Wi-Fi and Wi-Fi Direct base;
forming a reestablished Wi-Fi Direct communications link between the wireless Wi-Fi and Wi-Fi Direct device and the Wi-Fi and Wi-Fi Direct base;
receiving the audio data at the wireless Wi-Fi and Wi-Fi Direct device from the Wi-Fi and Wi-Fi Direct base over the reestablished Wi-Fi Direct communications link.

12. A method comprising:
exchanging an audio data directly between a wireless Wi-Fi and Wi-Fi Direct device and a Wi-Fi and Wi-Fi Direct base over a private network over a Wi-Fi Direct communications link between the wireless Wi-Fi and Wi-Fi Direct device and the Wi-Fi and Wi-Fi Direct base;
monitoring a signal quality of the Wi-Fi Direct communications link;
identifying whether the signal quality of the Wi-Fi Direct communications link is below a desired level;
exchanging an audio data between the wireless Wi-Fi and Wi-Fi Direct device and the Wi-Fi and Wi-Fi Direct base over a non-private network utilizing one or more Wi-Fi Access Points following an identification the signal quality of the Wi-Fi Direct communications link is below a desired level.

13. The method of claim 12, wherein the one or more Wi-Fi Access Points comprise a first Wi-Fi Access Point and a second Wi-Fi Access Point, the method further comprising:
forming a first wireless link between the wireless Wi-Fi and Wi-Fi Direct device and the first Wi-Fi Access Point; and
forming a second wireless link between the Wi-Fi and Wi-Fi Direct base and the second Wi-Fi Access Point.

14. The method of claim 12, wherein the Wi-Fi and Wi-Fi Direct base comprises a Universal Serial Bus device operable to couple to a Universal Serial Bus port of a computing device as a Universal Serial Bus audio device.

15. The method of claim 12, further comprising receiving a handoff message at the Wi-Fi and Wi-Fi Direct base from the wireless Wi-Fi and Wi-Fi Direct device, the handoff message comprising a wireless Wi-Fi and Wi-Fi Direct device non-private Internet Protocol address for exchanging the audio data between the wireless Wi-Fi and Wi-Fi Direct device and the Wi-Fi and Wi-Fi Direct base over a non-private network utilizing one or more Wi-Fi Access Points.

16. The method of claim 12, further comprising:
terminating the Wi-Fi Direct communications link between the wireless Wi-Fi and Wi-Fi Direct device and the Wi-Fi and Wi-Fi Direct base;
determining motion of the Wi-Fi and Wi-Fi Direct device utilizing contextual information;
detecting an increased signal quality between the wireless Wi-Fi and Wi-Fi Direct device and the Wi-Fi and Wi-Fi Direct base;

forming a reestablished Wi-Fi Direct communications link between the wireless Wi-Fi and Wi-Fi Direct device and the Wi-Fi and Wi-Fi Direct base; and exchanging the audio data between the wireless Wi-Fi and Wi-Fi Direct device from the Wi-Fi and Wi-Fi Direct base over a private network using the reestablished Wi-Fi Direct communications link.

17. A system comprising:
a Wi-Fi and Wi-Fi Direct base operable in Wi-Fi Direct mode or Wi-Fi mode, the Wi-Fi and Wi-Fi Direct base comprising:
  a base processor;
  a memory comprising a base application program comprising instructions which when executed by the base processor cause the Wi-Fi and Wi-Fi Direct base to perform operations comprising exchanging an audio data with a wireless Wi-Fi and Wi-Fi Direct device in either Wi-Fi Direct mode or Wi-Fi mode; and
a wireless Wi-Fi and Wi-Fi Direct device operable in Wi-Fi Direct mode or Wi-Fi mode, the wireless Wi-Fi and Wi-Fi Direct device comprising:
  a wireless Wi-Fi and Wi-Fi Direct device processor;
  a memory comprising a wireless Wi-Fi and Wi-Fi Direct device application program comprising instructions which when executed by the wireless Wi-Fi and Wi-Fi Direct device processor cause the wireless Wi-Fi and Wi-Fi Direct device to perform operations comprising, responsive to a signal strength between the wireless Wi-Fi and Wi-Fi Direct device and the Wi-Fi and Wi-Fi Direct base, either exchanging an audio data directly with the Wi-Fi and Wi-Fi Direct base over a private network using a Wi-Fi Direct communications link between the wireless Wi-Fi and Wi-Fi Direct device and the Wi-Fi and Wi-Fi Direct base, or exchanging an audio data with the Wi-Fi and Wi-Fi Direct base utilizing one or more Wi-Fi Access Points.

18. The system of claim 17, wherein the wireless Wi-Fi and Wi-Fi Direct device application program comprises instructions which cause the wireless Wi-Fi and Wi-Fi Direct device to perform further operations comprising transmitting a handoff message to the Wi-Fi and Wi-Fi Direct base over the Wi-Fi Direct communications link, wherein the handoff message comprises a wireless Wi-Fi and Wi-Fi Direct device non-private Internet Protocol address for use with a Wi-Fi Access Point.

19. The system of claim 17, wherein exchanging the audio data with the Wi-Fi and Wi-Fi Direct base utilizing one or more Wi-Fi Access Points comprises forming a Wi-Fi link between the wireless Wi-Fi and Wi-Fi Direct device and a Wi-Fi Access Point over a non-private network.

20. The system of claim 19, wherein the Wi-Fi link between the wireless Wi-Fi and Wi-Fi Direct device and the Wi-Fi Access Point is concurrent with the Wi-Fi Direct communications link between the wireless Wi-Fi and Wi-Fi Direct device and the Wi-Fi and Wi-Fi Direct base.

21. The system of claim 17, wherein the Wi-Fi and Wi-Fi Direct base comprises a Universal Serial Bus device operable to couple to a Universal Serial Bus port of a computing device as a Universal Serial Bus audio device.

22. The system of claim 17, wherein the wireless Wi-Fi and Wi-Fi Direct device comprises a wireless headset and the audio data comprises voice communications associated with a telephony call.

* * * * *